US012409783B2

(12) United States Patent
Ebanks

(10) Patent No.: US 12,409,783 B2
(45) Date of Patent: Sep. 9, 2025

(54) VEHICLE TAILGATE ASSEMBLY

(71) Applicant: Wentworth Ebanks, Portland, OR (US)

(72) Inventor: Wentworth Ebanks, Portland, OR (US)

(*) Notice: Subject to any disclaimer, the term of this patent is extended or adjusted under 35 U.S.C. 154(b) by 451 days.

(21) Appl. No.: 17/978,176

(22) Filed: Oct. 31, 2022

(65) Prior Publication Data

US 2024/0140316 A1    May 2, 2024

(51) Int. Cl.
| | | |
|---|---|---|
| *B60R 3/00* | (2006.01) | |
| *B60Q 1/00* | (2006.01) | |
| *B60Q 1/30* | (2006.01) | |
| *B62D 33/03* | (2006.01) | |

(52) U.S. Cl.
CPC ............ *B60R 3/007* (2013.01); *B60Q 1/0088* (2013.01); *B60Q 1/30* (2013.01); *B62D 33/03* (2013.01)

(58) Field of Classification Search
CPC .. B60R 3/02; B60R 3/007; B60Q 3/30; B62D 33/03
See application file for complete search history.

(56) References Cited

U.S. PATENT DOCUMENTS

| | | | |
|---|---|---|---|
| D397,978 S | 9/1998 | Helgeson | |
| 6,660,967 B2 | 12/2003 | Brofft | |
| 6,811,067 B2 | 11/2004 | Muizelaar | |
| 6,957,840 B1 * | 10/2005 | Endres | B62D 33/08 296/57.1 |
| 7,111,884 B2 | 9/2006 | Johnson | |
| 7,234,750 B1 * | 6/2007 | Doolittle | B60R 3/02 296/57.1 |
| 7,834,750 B1 * | 11/2010 | Hertz | B60Q 1/305 340/468 |
| 8,182,013 B1 * | 5/2012 | Alvarado | B60R 3/007 182/127 |
| 8,201,869 B1 * | 6/2012 | Butlin, Jr. | B60R 3/02 296/57.1 |
| 8,246,098 B2 * | 8/2012 | Cheung | B62D 33/0273 296/146.12 |
| 8,348,325 B2 * | 1/2013 | Hausler | B62D 33/0273 296/62 |
| 9,463,746 B2 * | 10/2016 | Butlin, Jr. | B62D 33/03 |
| 9,608,947 B2 | 3/2017 | Katis et al. | |
| 9,707,888 B1 * | 7/2017 | Frederick | H02S 30/20 |
| 9,809,160 B2 * | 11/2017 | Salter | H05B 47/115 |
| 9,849,830 B1 * | 12/2017 | Salter | F21S 43/16 |
| 9,994,263 B1 * | 6/2018 | Richter | B60P 1/435 |

(Continued)

FOREIGN PATENT DOCUMENTS

| | | | |
|---|---|---|---|
| WO | WO0158742 | 8/2001 | |
| WO | WO-2022019872 A1 * | 1/2022 | ............... B25H 5/00 |

*Primary Examiner* — Katy M Ebner

(57) ABSTRACT

A vehicle tailgate assembly includes a tailgate that is pivotally disposed on a bed of a pickup a panel space is integrated into the tailgate. A panel is hingedly disposed in the panel space in the tailgate. The panel is positionable in a closed or an open position. A step is slidably integrated into the panel and the step is positionable in a deployed position to facilitate a user to step on the step for climbing into the bed. A camera is integrated into the tailgate to record images of an area behind the pickup. The camera includes a transmitter which broadcasts a signal to a personal electronic device facilitating the personal electronic device to display the images recorded by the camera to assist with backing the pickup.

9 Claims, 4 Drawing Sheets

(56) References Cited

U.S. PATENT DOCUMENTS

| | | | |
|---|---|---|---|
| 10,106,087 B2* | 10/2018 | Stojkovic | B60P 3/14 |
| 10,449,893 B1* | 10/2019 | Singer | B60Q 1/2661 |
| 10,543,789 B1* | 1/2020 | Hemphill | B62D 33/037 |
| 10,740,796 B2* | 8/2020 | Brubaker | G09F 9/30 |
| 10,773,645 B2* | 9/2020 | Helm | B60R 9/055 |
| 10,807,518 B2* | 10/2020 | Miranda Nieto | B60Q 1/307 |
| 10,994,660 B2* | 5/2021 | Ngo | B62D 33/0273 |
| 11,242,097 B1* | 2/2022 | Gross, IV | H04R 5/02 |
| 11,535,161 B1* | 12/2022 | Walker | B60R 3/02 |
| 11,577,791 B2* | 2/2023 | Hung | B60R 3/02 |
| 11,591,030 B2* | 2/2023 | Snede | B60R 11/00 |
| 11,603,045 B2* | 3/2023 | Patterson | B62D 33/0273 |
| 11,608,123 B2* | 3/2023 | Jarjoura | B62D 33/0273 |
| 11,643,018 B2* | 5/2023 | Nania | B60R 3/02 280/166 |
| 11,643,151 B2* | 5/2023 | Nania | B62D 33/0273 296/51 |
| 11,661,118 B2* | 5/2023 | Goodenough | B60R 3/02 296/50 |
| 11,673,507 B2* | 6/2023 | Robinson | B60R 3/02 280/164.1 |
| 11,683,693 B1* | 6/2023 | Bayer | H04W 4/40 455/41.2 |
| 11,685,313 B2* | 6/2023 | Stojkovic | B62D 33/0273 280/164.1 |
| 11,701,954 B2* | 7/2023 | Kneifl | B60J 7/141 296/100.1 |
| 11,873,033 B2* | 1/2024 | Lehti | B60R 3/02 |
| 12,049,259 B2* | 7/2024 | Goodenough | B62D 33/0273 |
| 12,208,771 B2* | 1/2025 | Ricketts | B62D 33/0273 |
| 2004/0183326 A1* | 9/2004 | Tegtmeier | B62D 33/0273 296/62 |
| 2012/0126564 A1* | 5/2012 | Hausler | B62D 33/0273 296/57.1 |
| 2016/0176347 A1* | 6/2016 | Kiehl | H04N 23/51 348/148 |
| 2016/0311355 A1* | 10/2016 | Krajenke | B62D 33/0273 |
| 2017/0291551 A1* | 10/2017 | Krajenke | B62D 33/0273 |
| 2019/0054961 A1* | 2/2019 | Ngo | B60R 3/02 |
| 2020/0086807 A1* | 3/2020 | Shaeff | H04N 23/57 |
| 2020/0290525 A1* | 9/2020 | Viniegra | B60R 11/06 |
| 2021/0221448 A1* | 7/2021 | Hung | B62D 33/0273 |
| 2021/0293047 A1* | 9/2021 | Frederickson | B60P 3/341 |
| 2021/0380175 A1* | 12/2021 | Jarjoura | B62D 33/037 |
| 2021/0402929 A1* | 12/2021 | Robinson | B60R 3/02 |
| 2021/0403097 A1* | 12/2021 | Gase | B62D 33/0273 |
| 2022/0097608 A1* | 3/2022 | Patterson | B62D 33/03 |
| 2022/0169167 A1* | 6/2022 | Peterson | A47J 37/0736 |
| 2023/0113964 A1* | 4/2023 | Norris | B60R 25/1004 340/426.24 |
| 2023/0158958 A1* | 5/2023 | Ricketts | B62D 33/0273 280/166 |
| 2023/0249760 A1* | 8/2023 | Selle | B60R 3/02 296/51 |
| 2023/0356787 A1* | 11/2023 | Salter | B60Q 1/307 |
| 2023/0382306 A1* | 11/2023 | Brick | B60R 3/02 |
| 2024/0140337 A1* | 5/2024 | Dicke | B60L 53/22 |
| 2024/0300591 A1* | 9/2024 | Boisvert | B60R 7/02 |
| 2024/0394650 A1* | 11/2024 | Harris | G06Q 30/0633 |
| 2025/0033710 A1* | 1/2025 | Taylor | B62D 33/0273 |

* cited by examiner

VEHICLE TAILGATE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tailgate devices and more particularly pertains to a new tailgate device for opening and closing a bed of a pickup. The device includes a tailgate which has a panel space extending downwardly into the tailgate. The device includes a panel hingedly disposed in the panel space which can be opened or closed. The device also includes a step slidably integrated into the panel which can be positioned in a deployed position to assist with climbing onto the tailgate and entering the bed. The device includes a Bluetooth camera that is integrated into the tailgate and which can be synched with a personal electronic device.

(2) Description of Related Art Including Information Disclosed Under 37 CFR 1.97 and 1.98

The prior art relates to tailgate devices including a power unit that is structured to fit between wheel wells in a bed of a pickup. The prior art discloses a cargo box that is pivotally disposed on a bed of a pickup and a tailgate hingedly coupled to the cargo box. The prior art discloses tailgate device that includes a parallel linkage mechanism integrated into a bed of a pickup and a storage box attached to the parallel linkage mechanism. The prior art discloses a tailgate assembly that is pivotally mounted to a bed of a pickup and which includes safety lights integrated into the tailgate which are turned on when the tailgate is opened. The prior art discloses a tailgate device that has a storage compartment and a door for opening and closing the storage compartment. The prior art discloses a tailgate device that has a panel spaced integrated into a tailgate and a step that is mechanically disposed in the panel space which can be positioned between a stored position and a deployed position.

BRIEF SUMMARY OF THE INVENTION

An embodiment of the disclosure meets the needs presented above by generally comprising a tailgate that is pivotally disposed on a bed of a pickup a panel space is integrated into the tailgate. A panel is hingedly disposed in the panel space in the tailgate, the panel is positionable or an open position. A step is slidably integrated into the panel and the step is positionable in a deployed position to facilitate a user to step on the step for climbing into the bed. A camera is integrated into the tailgate record images of an area behind the pickup. The camera includes a transmitter which broadcasts a signal to a personal electronic device thereby facilitating the personal electronic device to display the images recorded by the camera to assist with backing the pickup.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
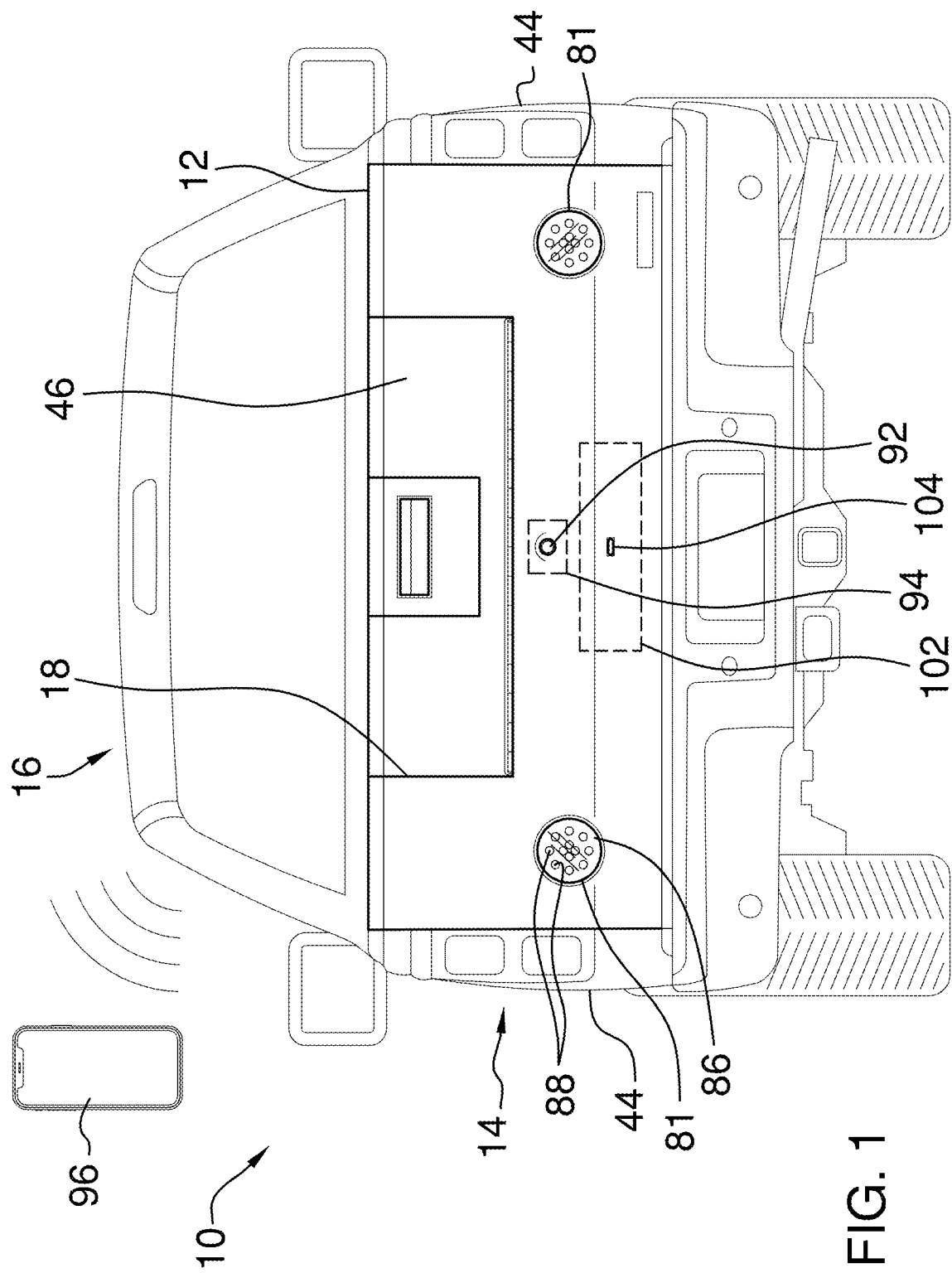
FIG. 1 is a rear in-use view of a vehicle tailgate assembly according to an embodiment of the disclosure.
Figure 2:
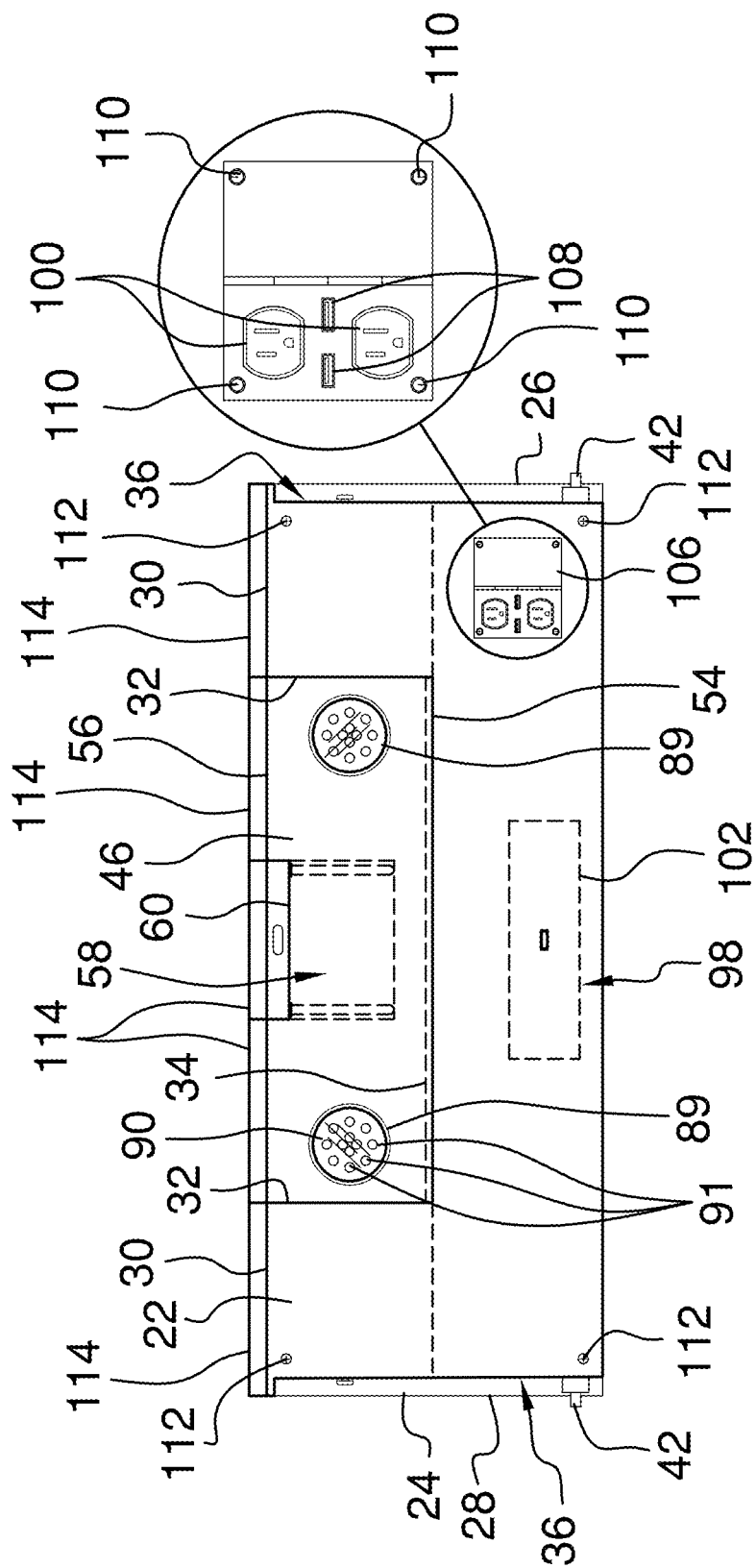
FIG. 2 is a front phantom view of an embodiment of the disclosure.
Figure 3:
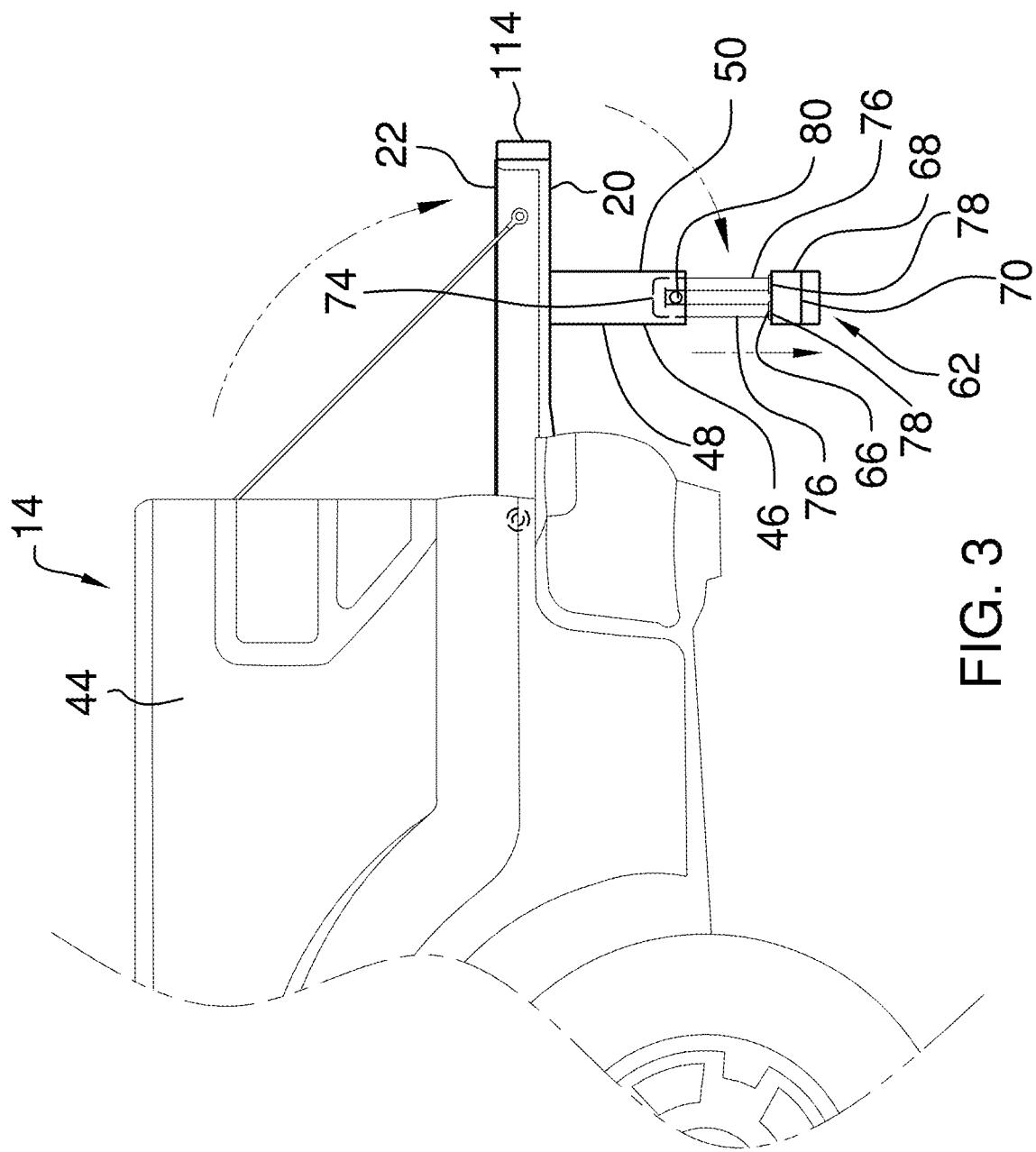
FIG. 3 is a left side in-use view of an embodiment of the disclosure.
Figure 4:
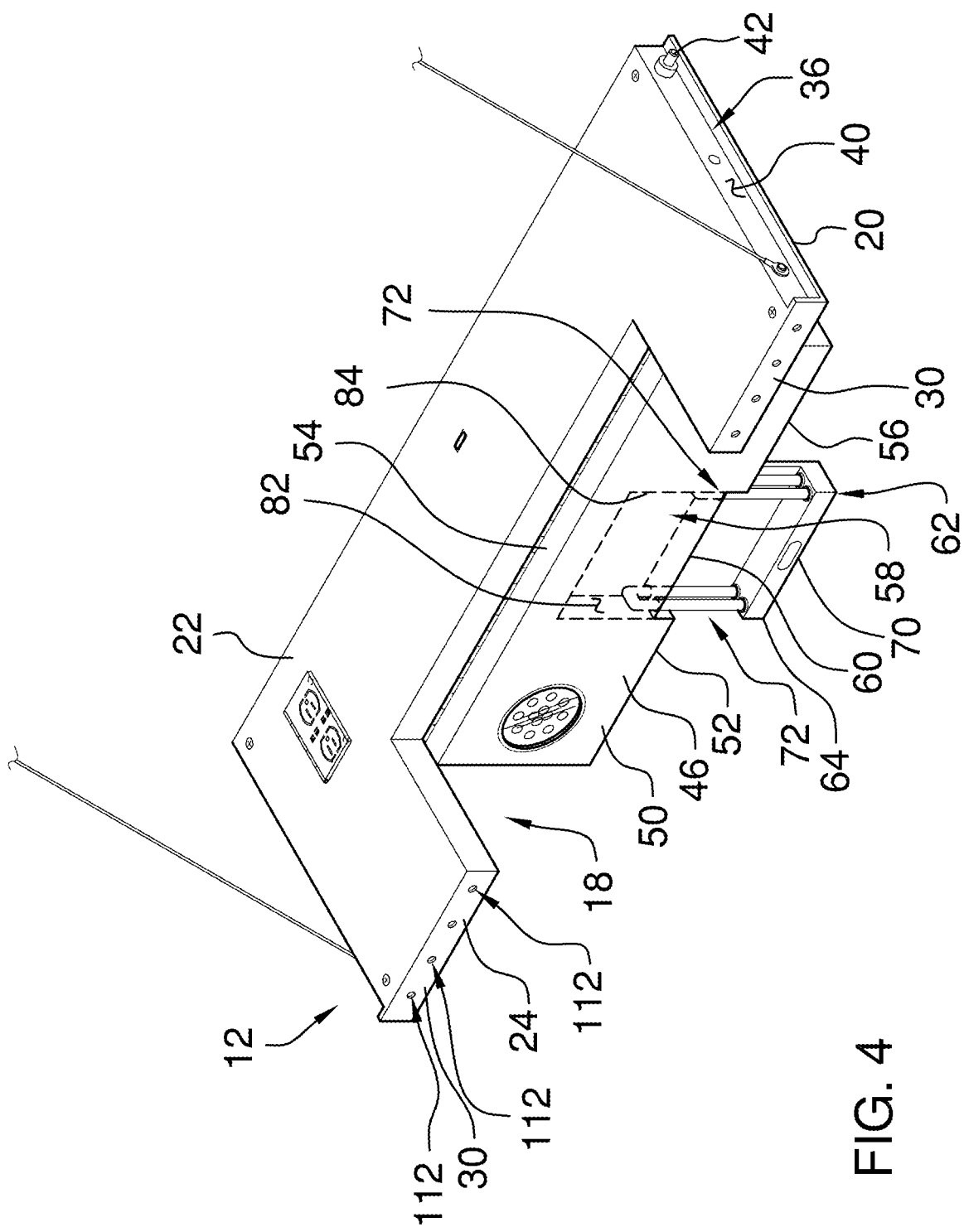
FIG. 4 is a top perspective view of an embodiment of the disclosure.

With reference now to the drawings, and in particular to FIGS. 1 through 4 thereof, a new tailgate device embodying the principles and concepts of an embodiment of the disclosure and generally designated by the reference numeral 10 will be described.

As best illustrated in FIGS. 1 through 4, the vehicle tailgate assembly 10 generally comprises a tailgate 12 that is pivotally disposed on a bed 14 of a pickup 16 for opening and closing the bed 14. The tailgate 12 has a panel space 18 that is integrated into the tailgate 12. Furthermore, the tailgate 12 has a front wall 20, a back wall 22 and a perimeter edge 24 extending between the front wall 20 and the back wall 22 and the perimeter edge 24 has a first lateral side 26 and a second lateral side 28. The perimeter edge 24 has a pair of top sides 30 each extending inwardly from a respective one of the first lateral side 26 and the second lateral side 28. Additionally, the perimeter edge 24 has a pair of first sides 32 each extending downwardly from a respective one of the top sides 30 and a second side 34 extending between the pair of first sides 32 such that the first sides 32 and the second side 34 defines the panel space 18 in the tailgate 12. Each of the first sides 32 is oriented parallel with the first lateral side 26 and the second lateral side 28 and the second side 34 is oriented parallel with each of the top sides 30.

Each of the first sides 32 is spaced an equal distance from a respective one of the first lateral side 26 and the second lateral side 28 such that the panel space 18 is centrally positioned in the tailgate 12. Each of the first lateral side 26 and the second lateral side 28 has a recess 36 extending toward the panel space 18 and the recess 36 in each of the first lateral side 26 and the second lateral side 28 has a bounding surface 40. Furthermore, each of the top sides 30 extends beyond the bounding surface 40 of the recess 36 in a respective one of the first lateral side 26 and the second lateral side 28. The front wall 20 extends outwardly beyond the bounding surface 40 of the recess 36 in each of the first lateral side 26 and the second lateral side 28.

A pair of pivots 42 is provided and each of the pivots 42 is rotatably disposed on the tailgate 12. Each of the pivots 42 engages a respective one of a pair of sidewalls 44 of the bed 14 of the pickup 16 for pivotally retaining the tailgate 12 on the bed 14. Each of the pivots 42 is biased to rotate in a first direction such that each of the pivots 42 urges the tailgate 12 into a closed position and each of the pivots 42 is rotatable in a second direction to facilitate the tailgate 12 to be positioned in an open position. Each of the pivots 42 has rotational torque in the first direction that is less than a weight of the tailgate 12 such that the pair of pivots 42 assists with closing the tailgate 12. Additionally, each of the pivots 42 is positioned on the bounding surface 40 of the recess 36 in a respective one of the first lateral side 26 and the second lateral side 28.

A panel 46 is provided and the panel 46 is hingedly disposed in the panel space 18 in the tailgate 12. The panel 46 is positionable in a closed position having the panel 46 lying flush with the tailgate 12. Conversely, the panel 46 is positionable in an open position having the panel 46 extending away from the tailgate 12. The panel 46 can serve as a step 62 when the tailgate 12 is in the closed position to assist with climbing over the tailgate 12 to enter the bed 14.

The panel 46 has a forward wall 48, a rearward wall 50 and an exterior edge 52 extending between the forward wall 48 and the rearward wall 50 and the exterior edge 52 has a lower side 54 and an upper side 56. The lower side 54 is hingedly coupled to the second side 34 of the perimeter edge 24 of the tailgate 12 having the lower side 54 extending along a full length of the second side 34. Each of the forward wall 48 and the rearward wall 50 is aligned with a respective one of the front wall 20 and the back wall 22 of the tailgate 12 when the panel 46 is in the closed position. Furthermore, the upper side 56 of the exterior edge 52 has a well 58 extending toward the lower side 54. The well 58 is centrally positioned along the upper side 56 and the well 58 has an upper threshold 60 that is spaced downwardly from the upper side 56.

A step 62 is slidably integrated into the panel 46 and the step 62 is positionable in a deployed position having the step 62 extending downwardly from the panel 46 when the panel 46 is in the open position. In this way the step 62 facilitates a user to step on the step 62 for climbing into the bed 14. The step 62 is positionable in a stored position having the step 62 being positioned in the panel 46. The step 62 comprises a member 64 that has a lower surface 66, a rear surface 68 and an upper surface 70.

The step 62 includes a pair of supports 72 that each has a central rod 74 extending between a pair of outward rods 76. Each of the outward rods 76 has a distal end 78 with respect to the central rod 74 and the distal end 78 of each of the outward rods 76 is attached to the lower surface 66 of the member 64. Each of the supports 72 is positioned adjacent to opposite ends of the member 64 with respect to each other. Each of the supports 72 slidably engages a respective one of a pair of engagements 80 that is each disposed on a respective one of a first lateral bounding surface 82 and a second lateral bounding surface 84 of the well 58 in the panel 46 such that each of the engagements 80 is positioned between the pair of outward rods 76 of a respective support 72. The central member 64 of each of the supports 72 abuts a respective engagement 80 when the step 62 is in the deployed position having the lower surface 66 of the member 64 being exposed with respect to the well 58 thereby facilitating the lower surface 66 to be stepped upon. The lower surface 66 of the step 62 is aligned with the upper threshold 60 of the well 58 and the upper surface 70 of the step 62 is aligned with the upper side 56 of the exterior edge 52 of the panel 46 when the step 62 is in the stored position.

A pair of first light emitters 81 is provided and each of the first light emitters 81 is integrated into the tailgate 12 to emit light outwardly from the tailgate 12 when the first light emitters 81 are turned on. Each of the first light emitters 81 is positioned on the front wall 20 of the tailgate 12 and each of the first light emitters 81 is positioned proximate a respective one of the first lateral side 26 and the second lateral side 28 of the perimeter edge 24 of the tailgate 12. Each of the first light emitters 81 is positioned proximate a bottom side 84 of the perimeter edge 24 of the tailgate 12. Each of the first light emitters 81 includes a lens 86 and a plurality of light emitting diodes 88 each integrated into the lens 86.

A pair of second light emitters 89 is provided and each of the second light emitters 89 is integrated into the panel 46 to emit light outwardly from the panel 46 when the second light emitters 89 are turned on. Each of the second light emitters 89 is positioned such that the second light emitters 89 are directed toward the bed 14 of the pickup 16 when the tailgate 12 is closed and the panel 46 is in the closed position. Additionally, each of the second light emitters 89 is positioned on the rearward wall 50 of the tailgate 12 and each of the second light emitters 89 is positioned on opposite sides of the well 58 with respect to each other. Each of the second light emitters 89 includes a lens 90 and plurality of light emitting diodes 91 integrated into the lens 90.

A camera 92 is integrated into the tailgate 12 to record images of an area behind the pickup 16. The camera 92 includes a transmitter 94 which broadcasts a signal to a personal electronic device 96 thereby facilitating the personal electronic device 96 to display the images recorded by the camera 92. In this way the camera 92 can assist with backing the pickup 16. The camera 92 is positioned on the back wall 22 of the tailgate 12 and the camera 92 is positioned beneath the panel space 18 in the tailgate 12. The transmitter 94 may comprise a radio frequency transmitter or the like and the transmitter 94 may employ Bluetooth communication protocols. Furthermore, the personal electronic device 96 may comprise a smart phone or other type of electronic device that has Bluetooth communication capabilities.

A power supply 98 is integrated into the tailgate 12 and the power supply 98 includes a pair of female electrical outlets 100 for powering electronic devices and each of the female electrical outlets 100 is disposed on the back wall 22 of the tailgate 12. The power supply 98 includes a rechargeable battery 102 that is positioned within the tailgate 12 and the rechargeable battery 102 is electrically coupled to the pair of female electrical outlets 100. Additionally, the power supply 98 includes a charge port 104 that is recessed into the front wall 20 of the tailgate 12 thereby facilitating the charge port 104 to insertably receive a charge cord and the charge port 104 is electrically coupled to the rechargeable battery 102 for charging the rechargeable battery 102. The charge port 104 may comprise a universal serial bus port or other similar type of conventional charge port. Additionally, each of the first light emitters 81 and each of the second light emitters 89 and the camera 92 is electrically coupled to the rechargeable battery 102.

A door 106 is removably attached to the back wall 22 of the tailgate 12 and each of the female electrical outlets 100 is integrated into the door 106. Additionally, a pair of power ports 108 is each recessed into the door 106 and each of the power ports 108 is electrically coupled to the rechargeable battery 102. A plurality of magnets 110 is each attached to the door 106 and each of the magnets 110 magnetically engages the tailgate 12 for removably retaining the door 106 on the tailgate 12. Furthermore, the back wall 22 of the tailgate 12 is removable and a plurality of fasteners 112 each extends through the back wall 22 and engages the tailgate 12 for removably retaining the back wall 22 on the tailgate 12. Each of the top sides 30 of the perimeter edge 24 of the tailgate 12 has a plurality of fastener holes 112 for receiving fasteners that are incorporated into a decorative element 114 for attaching the decorative element 114 to the top side of the perimeter edge 24. Additionally, decorative elements 114 can be attached to the upper side 56 of the exterior edge 52 of the panel 46 and the upper surface 70 of the step 62. In this way the decorative elements 114 on the tailgate 12 and the panel 46 and the step 62 can be coordinated with the paint scheme of the pickup 16 for enhancing the ornamental appearance of the tailgate 12.

In use, the tailgate 12 is retrofitted onto the bed 14 of the pickup 16 to enhance functionality of the bed 14 of the pickup 16. The panel 46 can be positioned in the open position when the tailgate 12 is positioned in the closed position to facilitate the panel 46 to be stepped upon to assist with climbing over the tailgate 12 to enter the bed 14. Additionally, the panel 46 can be positioned in the open position and the step 62 can be positioned in the deployed position when the tailgate 12 is in the open position. In this way the step 62 can be stepped upon to assist with climbing onto the tailgate 12 and subsequently entering the bed 14. The camera 92 can by synched with the personal electronic device thereby facilitating the personal electronic device to display the area behind the pickup 16 to assist with backing the pickup 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A vehicle tailgate assembly having a deployable step for assisting with climbing into a bed of a pickup, said assembly comprising:
  a tailgate being pivotally disposed on a bed of a pickup for opening and closing the bed, said tailgate having a panel space being integrated into said tailgate, said tailgate having a front wall, a back wall and a perimeter edge extending between said front wall and said back wall, said perimeter edge having a first lateral side and a second lateral side, said perimeter edge having a pair of top sides each extending inwardly from a respective one of said first lateral side and said second lateral side and a pair of first sides each extending downwardly from a respective one of said top sides and a second side extending between said pair of first sides such that said first sides and said second side defines said panel space in said tailgate, each of said first sides is oriented parallel with said first lateral side and said second lateral side, said second side being oriented parallel with each of said top sides, each of said first sides being spaced an equal distance from a respective one of said first lateral side and said second lateral side such that said panel space is centrally positioned in said tailgate, each of said first lateral side and said second lateral side having a recess extending toward said panel space, said recess in each of said first lateral side and said second lateral side having a bounding surface, each of said top sides extending beyond said bounding surface of said recess in a respective one of said first lateral side and said second lateral side, said front wall extending outwardly beyond said bounding surface of said recess in each of said first lateral side and said second lateral side;
  a panel being hingedly disposed in said panel space in said tailgate, said panel being positionable in a closed position having said panel lying flush with said tailgate, said panel being positionable in an open position having said panel extending away from said tailgate;
  a step being slidably integrated into said panel, said step being positionable in a deployed position having said step extending downwardly from said panel when said panel is in said open position wherein said step is configured to facilitate a user to step on said step for climbing into the bed, said step being positionable in a stored position having said step being positioned in said panel;
  a pair of first light emitters, each of said first light emitters being integrated into said tailgate wherein each of said first light emitters is configured to emit light outwardly from said tailgate when said first light emitters is turned on;
  a pair of second light emitters, each of said second light emitters being integrated into said panel wherein each of said second light emitters is configured to emit light outwardly from said panel when said second light emitters are turned on, each of said second light emitters being positioned such that said second light emit- ters are directed toward the bed of the pickup when said tailgate is closed and said panel is in said closed position; and a camera being integrated into said tailgate wherein said camera is configured to record images of an area behind the pickup, said camera including a transmitter broadcasting a signal to a personal electronic device thereby facilitating the personal electronic device to display the images recorded by said camera wherein said camera is configured to assist with backing the pickup.

2. The assembly according to claim 1, further comprising a pair of pivots, each of said pivots being rotatably disposed on said tailgate, each of said pivots engaging a respective one of a pair of sidewalls of the bed of the pickup for pivotally retaining said tailgate on the bed, each of said pivots being biased to rotate in a first direction such that each of said pivots urges said tailgate into a closed position, each of said pivots being rotatable in a second direction to facilitate said tailgate to be positioned in an open position, each of said pivots having rotational torque in said first direction being less than a weight of said tailgate such that said pair of pivots assists with closing said tailgate, each of said pivots being positioned on said bounding surface of said recess in a respective one of said first lateral side and said second lateral side.

3. The assembly according to claim 1, wherein said assembly includes a power supply being integrated into said tailgate said power supply including:

a pair of female electrical outlets for powering electronic devices, each of said female electrical outlets being disposed on said back wall of said tailgate, said power supply including a rechargeable battery being positioned within said tailgate, said rechargeable battery being electrically coupled to said pair of female electrical outlets; and a charge port being recessed into said front wall of said tailgate thereby facilitating said charge port to insertably receive a charge cord, said charge port being electrically coupled to said rechargeable battery.

4. A vehicle tailgate assembly having a deployable step for assisting with climbing into a bed of a pickup, said assembly comprising:

a tailgate being pivotally disposed on a bed of a pickup for opening and closing the bed, said tailgate having a panel space being integrated into said tailgate, said tailgate having a front wall, a back wall and a perimeter edge extending between said front wall and said back wall, said perimeter edge having a first lateral side and a second lateral side, said perimeter edge having a pair of top sides each extending inwardly from a respective one of said first lateral side and said second lateral side and a pair of first sides each extending downwardly from a respective one of said top sides and a second side extending between said pair of first sides such that said first sides and said second side defines said panel space in said tailgate, each of said first sides being oriented parallel with said first lateral side and said second lateral side, said second side being oriented parallel with each of said top sides, each of said first sides being spaced an equal distance from a respective one of said first lateral side and said second lateral side such that said panel space is centrally positioned in said tailgate;

a panel being hingedly disposed in said panel space in said tailgate, said panel being positionable in a closed position having said panel lying flush with said tailgate, said panel being positionable in an open position having said panel extending away from said tailgate, said panel has having a forward wall, a rearward wall and an exterior edge extending between said forward wall and said rearward wall, said exterior edge having a lower side and an upper side, said lower side being hingedly coupled to said second side of said perimeter edge of said tailgate having said lower side extending along a full length of said second side, each of said forward wall and said rearward wall being aligned with a respective one of said front wall and said back wall of said tailgate when said panel is in said closed position, said upper side of said exterior edge has a well extending toward said lower side, said well being centrally positioned along said upper side, said well having an upper threshold being spaced downwardly from said upper side;

a step being slidably integrated into said panel, said step being positionable in a deployed position having said step extending downwardly from said panel when said panel is in said open position wherein said step is configured to facilitate a user to step on said step for climbing into the bed, said step being positionable in a stored position having said step being positioned in said panel;

a pair of first light emitters, each of said first light emitters being integrated into said tailgate wherein each of said first light emitters is configured to emit light outwardly from said tailgate when said first light emitters is turned on;

a pair of second light emitters, each of said second light emitters being integrated into said panel wherein each of said second light emitters is configured to emit light outwardly from said panel when said second light emitters are turned on, each of said second light emitters being positioned such that said second light emitters are directed toward the bed of the pickup when said tailgate is closed and said panel is in said closed position; and a camera being integrated into said tailgate wherein said camera is configured to record images of an area behind the pickup, said camera including a transmitter broadcasting a signal to a personal electronic device thereby facilitating the personal electronic device to display the images recorded by said camera wherein said camera is configured to assist with backing the pickup.

5. The assembly according to claim 4, wherein said step comprises:

a member having a lower surface, a rear surface and an upper surface; and a pair of supports, each of said supports having a central rod extending between a pair of outward rods, each of said outward rods having a distal end with respect to said central rod, said distal end of each of said outward rods being attached to said lower surface of said member, each of said supports being positioned adjacent to opposite ends of said member with respect to each other, each of said supports slidably engaging a respective one of a pair of engagements each being disposed on a respective one of a first lateral bounding surface and a second lateral bounding surface of said well in said panel such that each of said engagements is positioned between said pair of outward rods of a respective support.

6. The assembly according to claim 5, wherein said central member of each of said supports abuts a respective engagement when said step is in said deployed position having said lower surface of said member being exposed with respect to said well thereby facilitating said lower surface to be stepped upon.

7. The assembly according to claim 5, wherein said lower surface of said step is aligned with said upper threshold of said well and said upper surface of said step being aligned with said upper side of said exterior edge of said panel when said step is in said stored position.

8. The assembly according to claim 4, wherein:
 each of said first light emitters is positioned on said front wall of said tailgate, each of said first light emitters being positioned proximate a respective one of said first lateral side and said second lateral side of said perimeter edge of said tailgate, each of said first light emitters being positioned proximate a bottom side of said perimeter edge of said tailgate; and
 each of said second light emitters is positioned on said rearward wall of said tailgate, each of said second light emitters being positioned on opposite sides of said well with respect to each other.

9. A vehicle tailgate assembly having a deployable step for assisting with climbing into a bed of a pickup, said assembly comprising:
 a tailgate being pivotally disposed on a bed of a pickup for opening and closing the bed, said tailgate having a panel space being integrated into said tailgate, said tailgate having a front wall, a back wall and a perimeter edge extending between said front wall and said back wall, said perimeter edge having a first lateral side and a second lateral side, said perimeter edge having a pair of top sides each extending inwardly from a respective one of said first lateral side and said second lateral side and a pair of first sides each extending downwardly from a respective one of said top sides and a second side extending between said pair of first sides such that said first sides and said second side defines said panel space in said tailgate, each of said first sides being oriented parallel with said first lateral side and said second lateral side, said second side being oriented parallel with each of said top sides, each of said first sides being spaced an equal distance from a respective one of said first lateral side and said second lateral side such that said panel space is centrally positioned in said tailgate, each of said first lateral side and said second lateral side having a recess extending toward said panel space, said recess in each of said first lateral side and said second lateral side having a bounding surface, each of said top sides extending beyond said bounding surface of said recess in a respective one of said first lateral side and said second lateral side, said front wall extending outwardly beyond said bounding surface of said recess in each of said first lateral side and said second lateral side;
 a pair of pivots, each of said pivots being rotatably disposed on said tailgate, each of said pivots engaging a respective one of a pair of sidewalls of the bed of the pickup for pivotally retaining said tailgate on the bed, each of said pivots being biased to rotate in a first direction such that each of said pivots urges said tailgate into a closed position, each of said pivots being rotatable in a second direction to facilitate said tailgate to be positioned in an open position, each of said pivots having rotational torque in said first direction being less than a weight of said tailgate such that said pair of pivots assists with closing said tailgate, each of said pivots being positioned on said bounding surface of said recess in a respective one of said first lateral side and said second lateral side;
 a panel being hingedly disposed in said panel space in said tailgate, said panel being positionable in a closed position having said panel lying flush with said tailgate, said panel being positionable in an open position having said panel extending away from said tailgate, said panel having a forward wall, a rearward wall and an exterior edge extending between said forward wall and said rearward wall, said exterior edge having a lower side and an upper side, said lower side being hingedly coupled to said second side of said perimeter edge of said tailgate having said lower side extending along a full length of said second side, each of said forward wall and said rearward wall being aligned with a respective one of said front wall and said back wall of said tailgate when said panel is in said closed position, said upper side of said exterior edge having a well extending toward said lower side, said well being centrally positioned along said upper side, said well having an upper threshold being spaced downwardly fro said upper side;
 a step being slidably integrated into said panel, said step being positionable in a deployed position having said step extending downwardly from said panel when said panel is in said open position wherein said step is configured to facilitate a user to step on said step for climbing into the bed, said step being positionable in a stored position having said step being positioned in said panel, said step comprising:
  a member having a lower surface, a rear surface and an upper surface; and
  a pair of supports, each of said supports having a central rod extending between a pair of outward rods, each of said outward rods having a distal end with respect to said central rod, said distal end of each of said outward rods being attached to said lower surface of said member, each of said supports being positioned adjacent to opposite ends of said member with respect to each other, each of said supports slidably engaging a respective one of a pair of engagements each being disposed on a respective one of a first lateral bounding surface and a second lateral bounding surface of said well in said panel such that each of said engagements is positioned between said pair of outward rods of a respective support, said central member of each of said supports abutting a respective engagement when said step is in said deployed position having said lower surface of said member being exposed with respect to said well thereby facilitating said lower surface to be stepped upon, said lower surface of said step being aligned with said upper threshold of said well and said upper surface of said step being aligned with said upper side of said exterior edge of said panel when said step is in said stored position;
 a pair of first light emitters, each of said first light emitters being integrated into said tailgate wherein each of said first light emitters is configured to emit light outwardly from said tailgate when said first light emitters is turned on, each of said first light emitters being positioned on said front wall of said tailgate, each of said first light emitters being positioned proximate a respective one of said first lateral side and said second lateral side of said perimeter edge of said tailgate, each of said first light emitters being positioned proximate a bottom side of said perimeter edge of said tailgate;

a pair of second light emitters, each of said second light emitters being integrated into said panel wherein each of said second light emitters is configured to emit light outwardly from said panel when said second light emitters are turned on, each of said second light emitters being positioned such that said second light emitters are directed toward the bed of the pickup when said tailgate is closed and said panel is in said closed position, each of said second light emitters being positioned on said rearward wall of said tailgate, each of said second light emitters being positioned on opposite sides of said well with respect to each other;

a camera being integrated into said tailgate wherein said camera is configured to record images of an area behind the pickup, said camera including a transmitter broadcasting a signal to a personal electronic device thereby facilitating the personal electronic device to display the images recorded by said camera wherein said camera is configured to assist with backing the pickup, said camera being positioned on said back wall of said tailgate, said camera being positioned beneath said panel space in said tailgate; and a power supply being integrated into said tailgate, said power supply including a pair of female electrical outlets for powering electronic devices, each of said female electrical outlets being disposed on said back wall of said tailgate, said power supply including a rechargeable battery being positioned within said tailgate, said rechargeable battery being electrically coupled to said pair of female electrical outlets, said power supply including a charge port being recessed into said front wall of said tailgate thereby facilitating said charge port to insertably receive a charge cord, said charge port being electrically coupled to said rechargeable battery.

* * * * *